(12) United States Patent
Fukuda

(10) Patent No.: US 7,639,825 B2
(45) Date of Patent: Dec. 29, 2009

(54) BONE-CONDUCTION HANDSET

(75) Inventor: Mikio Fukuda, Tokyo (JP)

(73) Assignee: Temco Japan Co., Ltd., Tokyo (JP)

( * ) Notice: Subject to any disclaimer, the term of this patent is extended or adjusted under 35 U.S.C. 154(b) by 709 days.

(21) Appl. No.: 10/597,386

(22) Filed: Jul. 24, 2006

(65) Prior Publication Data

US 2009/0190781 A1    Jul. 30, 2009

(30) Foreign Application Priority Data

Feb. 20, 2004   (JP)   ............... 2004-045075

(51) Int. Cl.
*H04R 25/00*   (2006.01)
(52) U.S. Cl. ........................ 381/151; 381/380
(58) Field of Classification Search ........... 381/151, 381/162, 364, 178, 380, 326
See application file for complete search history.

(56) References Cited

U.S. PATENT DOCUMENTS 2,245,835 A * 6/1941 Rudolph ............. 381/151
3,980,842 A * 9/1976 Weisbrich ........... 381/151
2003/0083116 A1  5/2003 Fukuda
2006/0285679 A1  12/2006 Fukuda
2006/0286998 A1  12/2006 Fukuda

FOREIGN PATENT DOCUMENTS

| JP | 8-102780 | 4/1996 |
| JP | 2003-348209 | 12/2003 |
| JP | 2004-312171 | 11/2004 |

* cited by examiner

*Primary Examiner*—Suhan Ni
(74) *Attorney, Agent, or Firm*—Schmeiser, Olsen & Watts

(57) ABSTRACT

The object is to provide a bone-conduction handset, which has its main body (1) sufficiently isolated from a bone-conduction speaker unit (3) so that: the chances that howling and sound leaking may occur are reduced; and, the handset is improved in easiness in use. In the handset, the speaker unit (3) is mounted on the main body (1) through a speaker mounting member (2) made of a vibration-proof material. The mounting member (2) is characterized by comprising a connection portion (6), which is disposed perpendicularly to both the handset body (1) and the speaker unit (3) in a manner such that the main body (1) and the speaker unit (3) have their opposed inner surfaces disposed adjacent to opposite sides of the connection portion (6), whereby the main body (1) is isolated from the speaker unit (3).

7 Claims, 5 Drawing Sheets

BONE-CONDUCTION HANDSET

TECHNICAL FIELD

The present invention relates to a bone-conduction handset, and more particularly to a bone-conduction handset necessary for a telephone set, which uses a bone-conduction speaker as a speaker thereof.

BACKGROUND ART

A bone-conduction speaker transmits an audio signal through a skull's vibration, not through air vibrations. Consequently, the bone-conduction speaker is substantially free from an external environmental noise. Due to this, the bone-conduction speaker is well adapted to any person who has difficulty in hearing, and therefore coming into increasingly wide spread use in communication instruments.

Such a bone-conduction speaker is used in an ordinary telephone set in a condition in which the bone-conduction speaker is fixedly mounted on an end portion of a main body 1 of the handset of the telephone set through a resilient board made of plastics, rubber or like materials good in damping properties in order to prevent howling from occurring, wherein the howling occurs when the bone-conduction speaker transfers its vibrations to the handset.

FIG. 9 shows a method for mounting a speaker unit of bone-conduction type on a main body of a conventional handset. In the conventional handset, a resilient board 32 is disposed between a speaker unit 33 and a main body 31 of the handset in a manner such that the resilient board 32 is brought into area contact with both the speaker unit 33 and the main body 31 of the handset. Due to this, the resilient board 32 exerts its damping effect during communication, so that, as far as possible, vibrations of the speaker unit 33 are prevented from transferring to the main body 31 of the handset.

In such a conventional method for mounting the speaker unit, it is possible to prevent howling to a certain extent due to the damping effect of the resilient board 32. However, since the resilient board is brought into area contact with both the speaker unit and the main body of the handset, it is impossible to have the speaker unit sufficiently isolated from the main body of the handset. Due to this, when a large output is issued from the speaker, it is impossible to achieve both a satisfactory prevention of howling and a satisfactory prevention of leakage of a sound. These are problems inherent in the conventional method.

See Japanese Patent documents:
Japanese Patent Laid-open No. 2003-348208; and
Japanese Patent Application No. 2002-352000.

DISCLOSURE OF THE INVENTION

Problems to be Solved by the Invention

In view of the problems inherent in the conventional method for mounting the bone-conduction type speaker unit on the main body of the handset, the present invention was made. Consequently, it is an object of the present invention to provide a bone-conduction handset, which has its main body (1) sufficiently isolated from a bone-conduction speaker unit (3) so that: the chances that howling and sound leaking may occur are reduced; and, the handset is improved in easiness in use.

Means for Solving the Problems

The above object of the present invention is achieved by providing:

A bone-conduction handset provided with a main body, on which a bone-conduction speaker unit is mounted through a speaker mounting member, characterized in that said speaker mounting member comprises a connection portion and is disposed perpendicularly to both said main body and said speaker unit in a manner such that said main body and said speaker unit have their opposed inner surfaces disposed adjacent to opposite sides of said connection portion, whereby said main body is isolated from said speaker unit.

In the bone-conduction handset described above, the connection portion thereof may assume a flat plate-like shape, a concave lens-like shape in cross-section, or, preferably may be provided with flexibility.

Preferably, the speaker mounting member is constructed of a side plate, wherein the side plate is disposed perpendicularly to opposite sides of the connection portion so as to extend in a direction perpendicular to the connection portion. Further, the speaker mounting member assumes an H-shaped form in cross-section. Still further, the side plate is provided with an engaging means disposed on each of the speaker unit and the main body of the handset.

EFFECT OF THE INVENTION

In the bone-conduction type handset of the present invention, the speaker mounting member is disposed perpendicularly to opposite surfaces of the main body of the handset and of the speaker unit, and provided with the connection portion, through which the main body of the handset is isolated from the speaker unit. Consequently, the speaker unit is sufficiently isolated from the main body of the handset so that it is hard for vibrations of the speaker unit from transferring to the main body of the handset. Due to this, when a large output is issued from the speaker unit, it is possible for the handset of the present invention to prevent howling from occurring and also prevent leakage of a sound.

In the invention as set forth in claim 4, the speaker unit is swingable in operation, which makes it possible for a user of the handset to change an angle of the speaker unit relative to an abutting surface of the user's side head portion. Due to this, it is possible to improve the handset of the present invention in fittability in use.

BEST MODE FOR CARRYING OUT THE INVENTION

Next, with reference to the accompanying drawings, preferred embodiments for carrying out the present invention will be described.

FIG. 1 is a side view illustrating a bone-conduction handset of the present invention in construction (wherein an internal mechanism of the handset is not shown). FIG. 2 is an exploded perspective view of the handset. The bone-conduction handset is constructed of: a main body 1 of the handset; and, a bone-conduction speaker, which is mounted in the main body 1 of the handset through a speaker mounting member 2. Although not shown in the drawings, appropriate instruments and cables necessary for the handset are incorporated in the main body 1 of the handset.

The speaker mounting member 2 shown in FIGS. 1 and 2 assumes an H-shaped form in cross-section. This mounting member 2 is constructed of: an engaging plate 4 in the side of the main body, which plate 4 is engaged with an inner surface of the main body 1 of the handset; an engaging plate 5 in the side of the speaker, which plate 5 is engaged with a side surface of the speaker unit 3; and, a connection portion 6 through which the engaging plate 4 in the side of the main body is connected with the engaging plate 5 in the side of the speaker.

Incidentally, each of the engaging plates 4, 5 is provided for convenience in fixedly mounting an end portion of the connection portion 6 on each of main body 1 of the handset and the speaker unit 3. Consequently, these engaging plates 4, 5 are not indispensable elements for the present invention. In other words, it is possible to have the end portion of the connection portion 6 directly fixedly mounted on each of the main body 1 of the handset and the speaker unit 3.

In the case where both the engaging plates 4, 5 are provided, the speaker mounting member 2 may assume not only the H-shaped form, but also any other forms such as ones: in the first one of which the connection portion 6 is moved upward or downward (FIG. 3A); and, in the second one of which the engaging plate 4 in the side of the main body 1 is moved in a direction opposite to a direction in which the engaging plate 5 in the side of the speaker is moved (FIG. 3B). Further, the connection portion 6, which generally assumes a flat plate-like shape, may be constructed of a curved plate (FIG. 3C). Furthermore, it is also possible for the connection portion 6 to assume a concave lens-like shape, a center of which is depressed in shape (FIG. 3D). In addition, it is also possible to have the connection portion 6 constructed of a partially hollow member (FIG. 3E).

The speaker mounting member 2 may be made of a resilient material such as plastics, rubber and the like materials excellent in damping properties. It is preferable for the connection portion 6 to have flexibility. In this case, the speaker unit 3 may be swingable in operation to improve the handset in fittability in use.

The main body 1 of the handset itself is provided with a fixing means 7 for having the engaging plate 4 in the side of the main body 1 engaged with an upper portion of the main body 1. On the other hand, the speaker unit 3 is provided with a fixing means 8 for having the engaging plate 5 in the side of the speaker engaged with the speaker unit 3. Next, a concrete example of each of these fixing means 7, 8 will be described with reference to FIGS. 4 to 6.

In FIG. 4, the reference numerals 10, 11 denote speaker casings, which are combined with each other to form a completed casing. In the embodiment shown in the drawings, a pair of bone-conduction speakers 12 are incorporated in this completed casing.

As shown in FIG. 5, each of the engaging plate 4 in the side of the main body and the engaging plate 5 in the side of the speaker both disposed in the speaker mounting member 2 assumes a rectangular shape, four corners of which have been cut. These engaging plates 4 and 5 are provided with positioning holes 12 and 13, respectively. In general, the number of each of the positioning holes 12, 13 is two.

A positioning hole 13 in the side of the speaker corresponds to a positioning projection 14 provided in an outer side surface of a speaker casing 11. This positioning hole 13 receives therein the projection 14 in an insertion manner in an assembling operation. On the other hand, the speaker casing 11 is provided with four pieces of threaded sleeves 15. These sleeves 15 are disposed around the projection 14, project outwards, correspond in position to four cut corners of the engaging plate 5 in the side of the speaker, and correspond in height or thickness to the engaging plate 5 in the side of the speaker. Consequently, in an assembling operation, the projection 14 is inserted into the positioning hole 13 so that the engaging plate 5 in the side of the speaker is set. At this time, all the threaded sleeves 15 abut on the four corners of the engaging plate 5 of the side of the speaker and are kept at the same height or level.

The reference numerals 16, 17 denote a pair of push-down covers in the side of the speaker. These covers 16 and 17 abut on an upper and a lower portion of the engaging plate 5 in the side of the speaker, respectively, from inside, so that the engaging plate 5 in the side of the speaker is fixedly mounted.

The reference numerals 18, 19 denote a pair of push-down covers provided in the side of the main body 1. These covers 18, 19 are threadably engaged with a threaded sleeve 15 in a condition in which they 18, 19 abut on an upper and a lower portion of the engaging plate 4 in the side of the main body 1, respectively, from inside, so that the upper and the lower portions of the engaging plate 4 are sandwiched between such abutting surfaces and a plate 20. The plate 20 is fixedly mounted on these push-down covers 18, 19 in the side of the main body 1 by means of screws. Incidentally, each of the above-mentioned abutting surfaces of the push-down covers 18, 19 is provided with a protrusion 21. This protrusion 21 corresponds to a positioning hole 12 formed in the engaging plate 4 in the side of the main body 1.

The reference numeral 22 denotes a decorative rim, which is fit in a clearance between the speaker unit 3 and the corresponding speaker mounting portion of the main body 1 of the handset to fill the clearance (see FIG. 6).

Incidentally, the method for mounting the speaker unit by means of the speaker mounting member 2 is not limited to the above-mentioned one. For example, it is possible to mount the speaker unit on the main body 1 of the handset by laterally sliding the speaker mounting member 2 and by engaging the same member 2 with stationary fixing means 7, 8. Further, it is also possible to employ a bonding method and any other arbitrary method.

FIG. 7 is a graph showing the test results of check tests with respect to the isolation performance of the bone-conduction handset of the present invention. And, FIG. 8 is a graph showing the test results of check tests with respect to the isolation performance of the conventional type of bone-conduction handset. In each of these graphs: an upper curve shows a speaker characteristic obtained when an input is inputted to the speaker; and, a lower curve shows a microphone output characteristic, which is obtained when a microphone picks up a leakage of the above-mentioned input inputted to the speaker. The more a difference between these curves increases, the more the degree of isolation increases to reach a high degree of isolation to make it possible for such a high degree of isolation to prevent a noise known as "howling".

As is clear from these graphs, in this embodiment, a high degree of effectiveness of the present invention is sufficiently confirmed since the level of noise in the case of the present invention is improved by approximately 20 dB relative to the conventional case.

While the present invention has been described in detail to some extent with reference to the preferred embodiments thereof, it will be understood by those skilled in the art that various changes in form and details may be made therein without departing from the spirit and scope of the present invention as defined by the appended claims. In other words, the present invention is not limited in scope by its specified embodiments.

BRIEF DESCRIPTION OF THE DRAWINGS

FIG. 3(A) is a view illustrating a method for fixing the yoke and the diaphragm, which constitute the bone-conduction device of the present invention.

Figure 1:
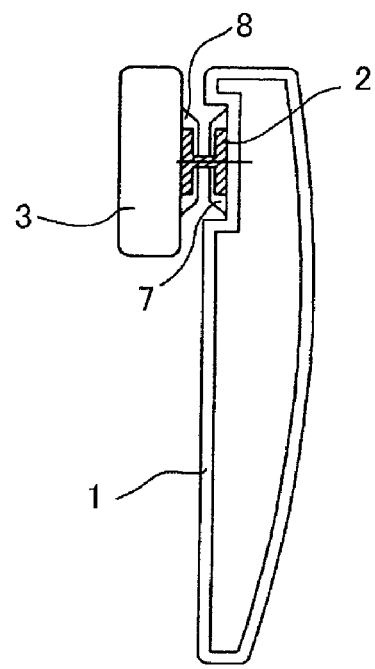
FIG. 1 is a side view of an embodiment of the bone-conduction handset according to the present invention.
Figure 2:
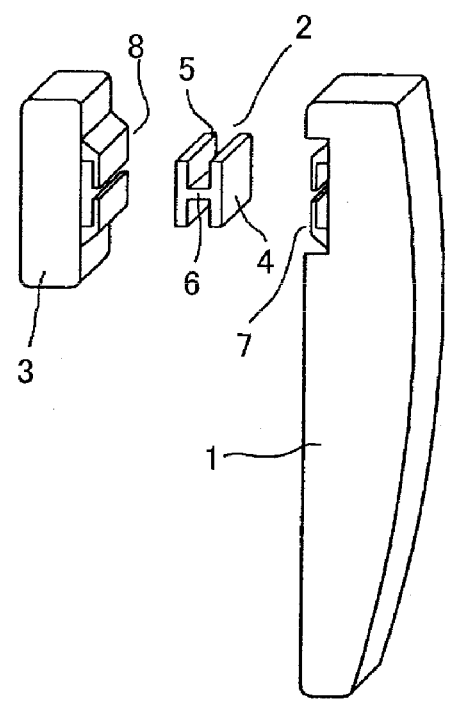
FIG. 2 is an exploded perspective view of the embodiment of the handset according to the present invention.
Figure 3:
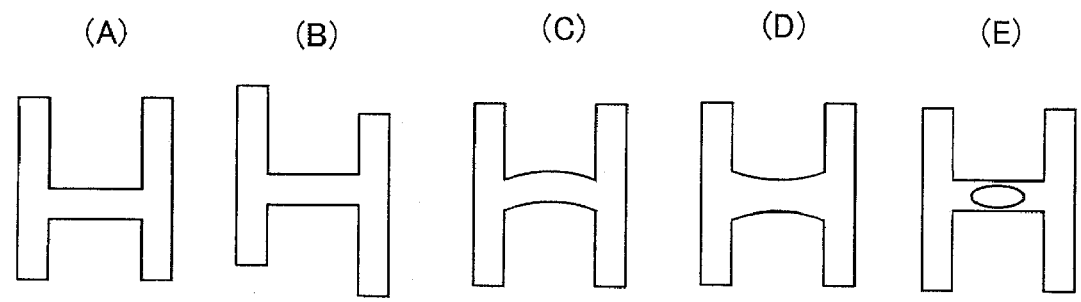
FIG. 3 is a view illustrating various embodiments of the speaker mounting member used in the bone-conduction handset of the present invention.
Figure 4:
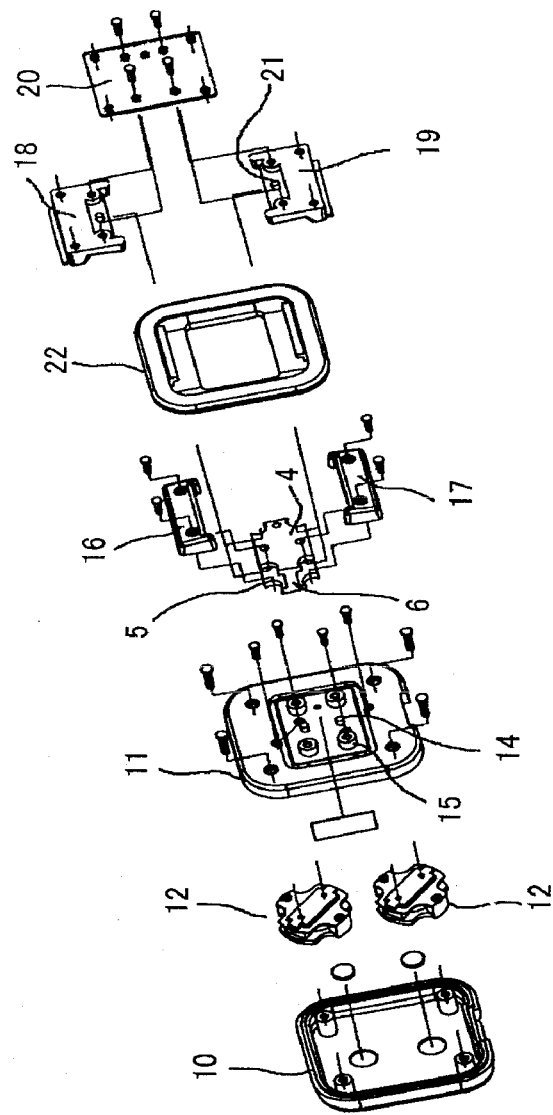
FIG. 4 is a exploded perspective view illustrating a method for mounting the speaker unit on the bone-conduction handset of the present invention.
Figure 5:
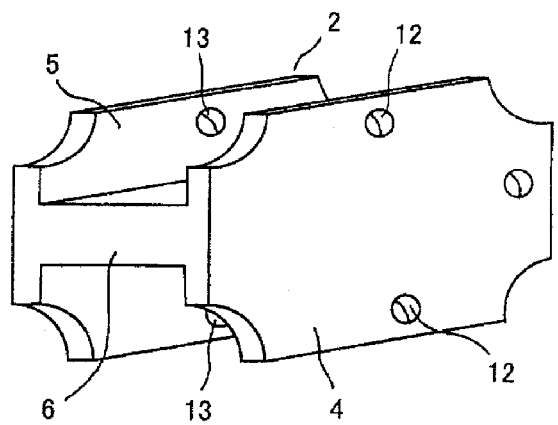
FIG. 5 is a perspective view of an embodiment of the speaker mounting member used in the bone-conduction handset of the present invention.
Figure 6:
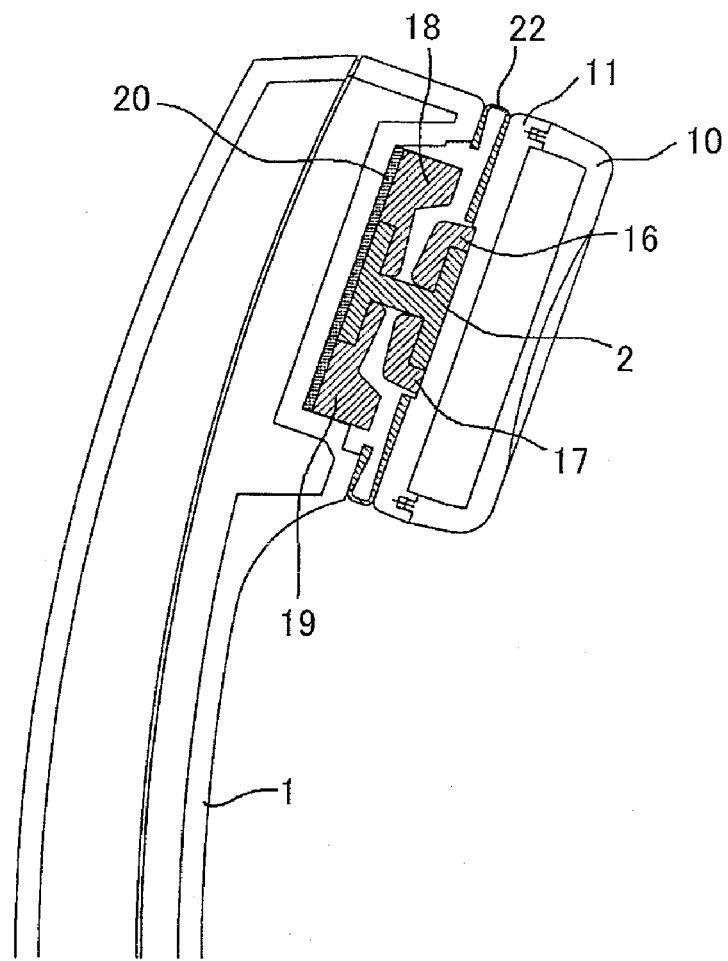
FIG. 6 is a view illustrating a mounting condition of the bone-conduction handset of the present invention.
Figure 7:
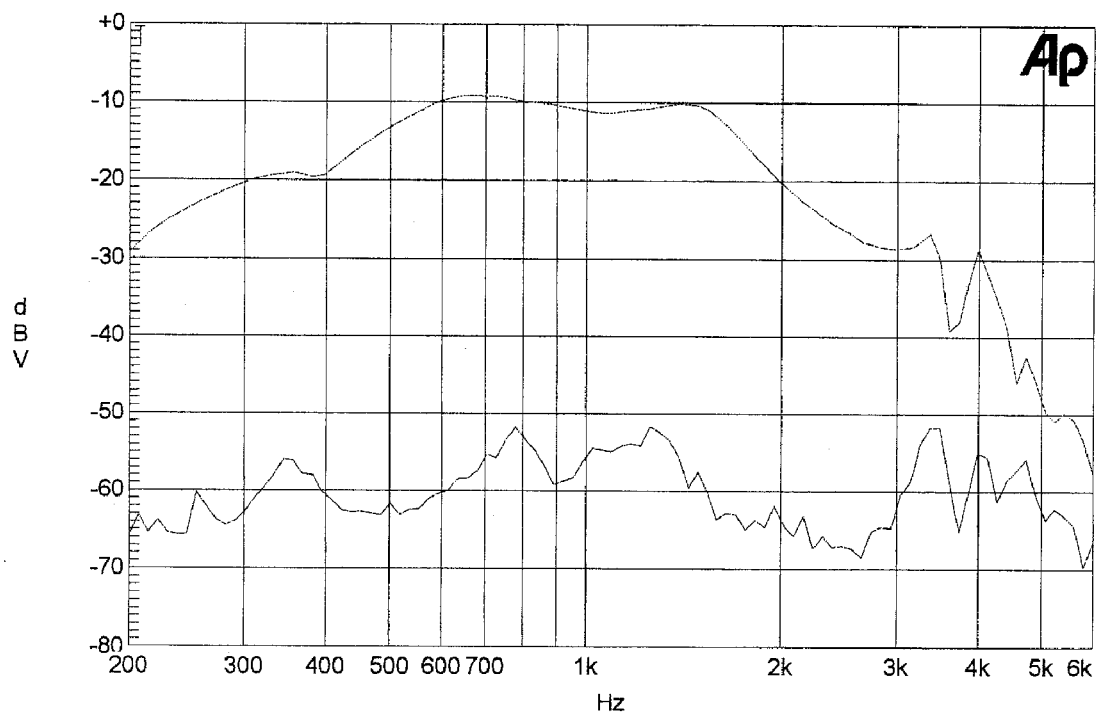
FIG. 7 is a graph illustrating the isolation performance of the bone-conduction handset of the present invention.
Figure 8:
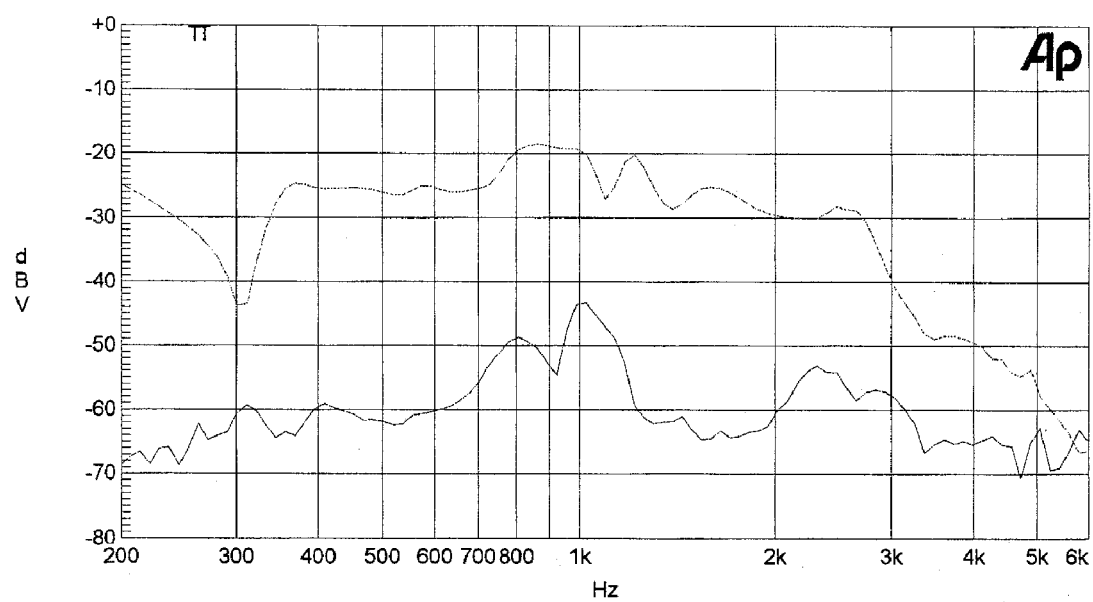
FIG. 8 is a graph illustrating the isolation performance of the conventional bone-conduction handset.
Figure 9:
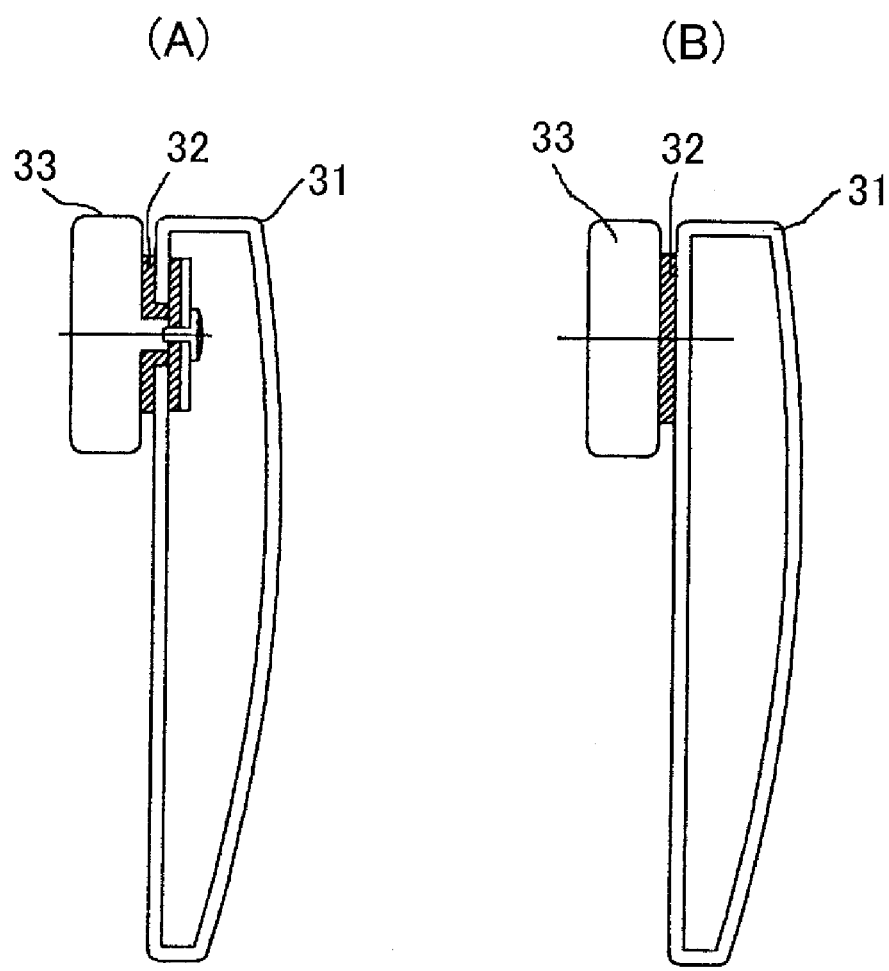
FIG. 9 is a view illustrating an example of the conventional bone-conduction handset in construction.

The invention claimed is:

1. A bone-conduction handset provided with a main body, on which a bone-conduction speaker unit is mounted through a speaker mounting member, characterized in that said speaker mounting member comprises a connection portion and is disposed perpendicularly to both said main body and said speaker unit in a manner such that said main body and said speaker unit have their opposed inner surfaces disposed adjacent to opposite sides of said connection portion, whereby said main body is isolated from said speaker unit.

2. The bone-conduction handset as set forth in claim 1, wherein said connection portion assumes a flat plate-like shape.

3. The bone-conduction handset as set forth in claim 1, wherein said connection portion assumes a concave lens-like shape in cross-section.

4. The bone-conduction handset as set forth in claim 1, wherein said connection portion is provided with flexibility.

5. The bone-conduction handset as set forth in claim 1, wherein said speaker mounting member is constructed of a side plate, wherein said side plate is disposed perpendicularly to opposite sides of said connection portion so as to extend in a direction perpendicular to said connection portion.

6. The bone-conduction handset as set forth in claim 5, wherein said speaker mounting member assumes an H-shaped form in cross-section.

7. The bone-conduction handset as set forth in claim 5, wherein said side plate is provided with an engaging means disposed on each of said speaker unit and said main body of said handset.

* * * * *